United States Patent
Ward et al.

(10) Patent No.: US 10,761,856 B2
(45) Date of Patent: Sep. 1, 2020

(54) INSTRUCTION COMPLETION TABLE CONTAINING ENTRIES THAT SHARE INSTRUCTION TAGS

(71) Applicant: INTERNATIONAL BUSINESS MACHINES CORPORATION, Armonk, NY (US)

(72) Inventors: Kenneth L. Ward, Austin, TX (US); Dung Q. Nguyen, Austin, TX (US); Hung Le, Austin, TX (US); Susan E. Eisen, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/039,848

(22) Filed: Jul. 19, 2018

(65) Prior Publication Data
US 2020/0026521 A1    Jan. 23, 2020

(51) Int. Cl.
*G06F 9/38* (2018.01)

(52) U.S. Cl.
CPC .......... *G06F 9/3851* (2013.01); *G06F 9/3836* (2013.01); *G06F 9/3842* (2013.01); *G06F 9/3855* (2013.01); *G06F 9/3857* (2013.01); *G06F 9/3861* (2013.01)

(58) Field of Classification Search
CPC .... G06F 9/3851; G06F 9/3855; G06F 9/3857; G06F 9/3861; G06F 9/3836; G06F 9/3842; G06F 9/3838
See application file for complete search history.

(56) References Cited

U.S. PATENT DOCUMENTS

| | | | | |
|---|---|---|---|---|
| 5,197,139 | A | | 3/1993 | Emma et al. |
| 5,586,278 | A | * | 12/1996 | Papworth .............. G06F 9/3863 712/217 |
| 6,134,645 | A | * | 10/2000 | Nguyen ................ G06F 9/3834 712/205 |
| 6,209,084 | B1 | * | 3/2001 | Chinnakonda ...... G06F 9/30036 712/23 |

(Continued)

FOREIGN PATENT DOCUMENTS

WO    2009005750 A2    1/2009

*Primary Examiner* — Steven G Snyder
(74) *Attorney, Agent, or Firm* — Cantor Colburn LLP; Bryan Bortnick

(57) ABSTRACT

Systems, methods, and computer-readable media are described for performing instruction execution using an instruction completion table (ICT) that is configured to accommodate shared ICT entries. A shared ICT entry maps to multiple instructions such as, for example, two instructions. Each shared ICT entry may be referenced by an even instruction tag (ITAG) and an odd ITAG that correspond to respective instructions that have been grouped together in the shared ICT entry. The instructions corresponding to a given shared ICT entry can be executed and finished independently of one another. A shared ICT entry is completed when each execution of each instruction corresponding to the shared ICT entry has finished and when all prior ICT entries have completed. Also described herein are system, methods, and computer-readable media for flushing instructions in shared ICT entries in response to execution of a branch instruction.

17 Claims, 6 Drawing Sheets

(56) References Cited

U.S. PATENT DOCUMENTS

| | | | |
|---|---|---|---|
| 6,324,640 B1 * | 11/2001 | Le | G06F 9/3836 712/212 |
| 6,446,029 B1 * | 9/2002 | Davidson | G06F 11/3409 702/182 |
| 6,530,042 B1 * | 3/2003 | Davidson | G06F 11/3409 714/44 |
| 6,539,502 B1 * | 3/2003 | Davidson | G06F 11/3466 712/227 |
| 6,550,002 B1 * | 4/2003 | Davidson | G06F 9/3836 712/216 |
| 6,574,727 B1 * | 6/2003 | Davidson | G06F 9/30181 712/227 |
| 6,681,321 B1 * | 1/2004 | Dale | G06F 11/3636 712/227 |
| 6,694,427 B1 * | 2/2004 | Mericas | G06F 9/3802 712/227 |
| 6,804,770 B2 * | 10/2004 | Logan | G06F 9/3861 711/135 |
| 6,970,999 B2 * | 11/2005 | Kurihara | G06F 9/3836 712/227 |
| 7,086,035 B1 * | 8/2006 | Mericas | G06F 9/3842 712/E9.05 |
| 7,124,144 B2 | 10/2006 | Christianson et al. | |
| 7,278,011 B2 * | 10/2007 | Eisen | G06F 9/3836 712/218 |
| 8,335,911 B2 * | 12/2012 | Golla | G06F 9/3851 712/220 |
| 8,909,908 B2 * | 12/2014 | Hooker | G06F 9/3806 712/239 |
| 9,471,313 B1 * | 10/2016 | Busaba | G06F 9/30058 |
| 9,489,207 B2 * | 11/2016 | Burky | G06F 9/3851 |
| 10,007,525 B2 * | 6/2018 | Alexander | G06F 9/3853 |
| 10,007,526 B2 * | 6/2018 | Alexander | G06F 9/3853 |
| 2002/0138713 A1 * | 9/2002 | Logan | G06F 9/3836 712/214 |
| 2004/0025146 A1 * | 2/2004 | Kurihara | G06F 9/3836 717/131 |
| 2005/0228972 A1 * | 10/2005 | Eisen | G06F 9/3836 712/218 |
| 2009/0259827 A1 * | 10/2009 | Ramirez | G06F 9/3838 712/216 |
| 2010/0262807 A1 * | 10/2010 | Burky | G06F 9/3851 712/205 |
| 2010/0299499 A1 * | 11/2010 | Golla | G06F 9/3851 712/206 |
| 2010/0306506 A1 * | 12/2010 | Hooker | G06F 9/3806 712/216 |
| 2016/0117172 A1 * | 4/2016 | Alexander | G06F 9/3853 712/215 |
| 2016/0117175 A1 * | 4/2016 | Alexander | G06F 9/3853 712/215 |
| 2017/0090937 A1 | 3/2017 | Eisen et al. | |
| 2017/0364356 A1 | 12/2017 | Ayub et al. | |
| 2018/0004516 A1 | 1/2018 | Feiste et al. | |
| 2019/0163490 A1 * | 5/2019 | Silberman | G06F 9/3867 |
| 2020/0042732 A1 * | 2/2020 | Nair | G06F 21/80 |

* cited by examiner

| Entry | ITAG | Valid Bit | Wrap Bit | Additional Shared Content | RTC Bit | Finish Even Bit | Finish Odd Bit |
|---|---|---|---|---|---|---|---|
| 0 | W0 0000 000X (0/1) OR (512/513) | (0/1) | (0/1) | xxxx… | (0/1) | (0/1) | (0/1) |
| 1 | W0 0000 001X (2/3) OR (514/515) | (0/1) | (0/1) | xxxx… | (0/1) | (0/1) | (0/1) |
| … | … | … | … | … | … | … | … |
| 255 | W1 1111 111X (510/511) OR (1022/1023) | (0/1) | (0/1) | xxxx… | (0/1) | (0/1) | (0/1) |

Instruction Completion Table (ICT) 200

ICT Entries 202

FIG. 2

INSTRUCTION COMPLETION TABLE CONTAINING ENTRIES THAT SHARE INSTRUCTION TAGS

BACKGROUND

The present invention relates generally to instruction execution, and more particularly, to instruction completion tables.

A conventional instruction completion table contains multiple entries, where each entry corresponds to a single instruction that has been dispatched. An entry in the instruction completion table that corresponds to a given instruction is accessible using an instruction tag associated with that instruction. In particular, an instruction tag can be used to index the instruction completion table and locate a corresponding entry, and as a result, identify a corresponding instruction. Conventional instruction completion tables, where each entry represents a single instruction using a single instruction tag, suffer from a number of drawbacks, technical solutions to which are described herein.

SUMMARY

In one or more example embodiments, a method for instruction execution utilizing an instruction completion table containing entries that share instruction tags is disclosed. The method includes fetching a first instruction, fetching a second instruction, and dispatching the first instruction and the second instruction. The first and second instructions are dispatched at least in part by generating a single entry in the ICT for the first instruction and the second instruction. The single ICT entry that is generated represents the first instruction using a corresponding even instruction tag (ITAG) and represents the second instruction using a corresponding odd ITAG.

In one or more other example embodiments, a system for instruction execution utilizing an instruction completion table containing entries that share instruction tags is disclosed. The system includes at least one memory storing computer-executable instructions and at least one processor, the at least one processor being configured to access the at least one memory and execute the computer-executable instructions to perform a set of operations.

The operations include fetching a first instruction, fetching a second instruction, and dispatching the first instruction and the second instruction. The first and second instructions are dispatched at least in part by generating a single entry in the ICT for the first instruction and the second instruction. The single ICT entry that is generated represents the first instruction using a corresponding even instruction tag (ITAG) and represents the second instruction using a corresponding odd ITAG.

In one or more other example embodiments, a computer program product for instruction execution utilizing an instruction completion table containing entries that share instruction tags is disclosed. The computer program product includes a non-transitory storage medium readable by a processing circuit, the storage medium storing instructions executable by the processing circuit to cause a method to be performed.

The method performed responsive to execution of the instructions stored on the storage medium includes fetching a first instruction, fetching a second instruction, and dispatching the first instruction and the second instruction. The first and second instructions are dispatched at least in part by generating a single entry in the ICT for the first instruction and the second instruction. The single ICT entry that is generated represents the first instruction using a corresponding even instruction tag (ITAG) and represents the second instruction using a corresponding odd ITAG.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 2 depicts an example implementation of an instruction completion table in accordance with one or more example embodiments.

DETAILED DESCRIPTION

Figure 1:
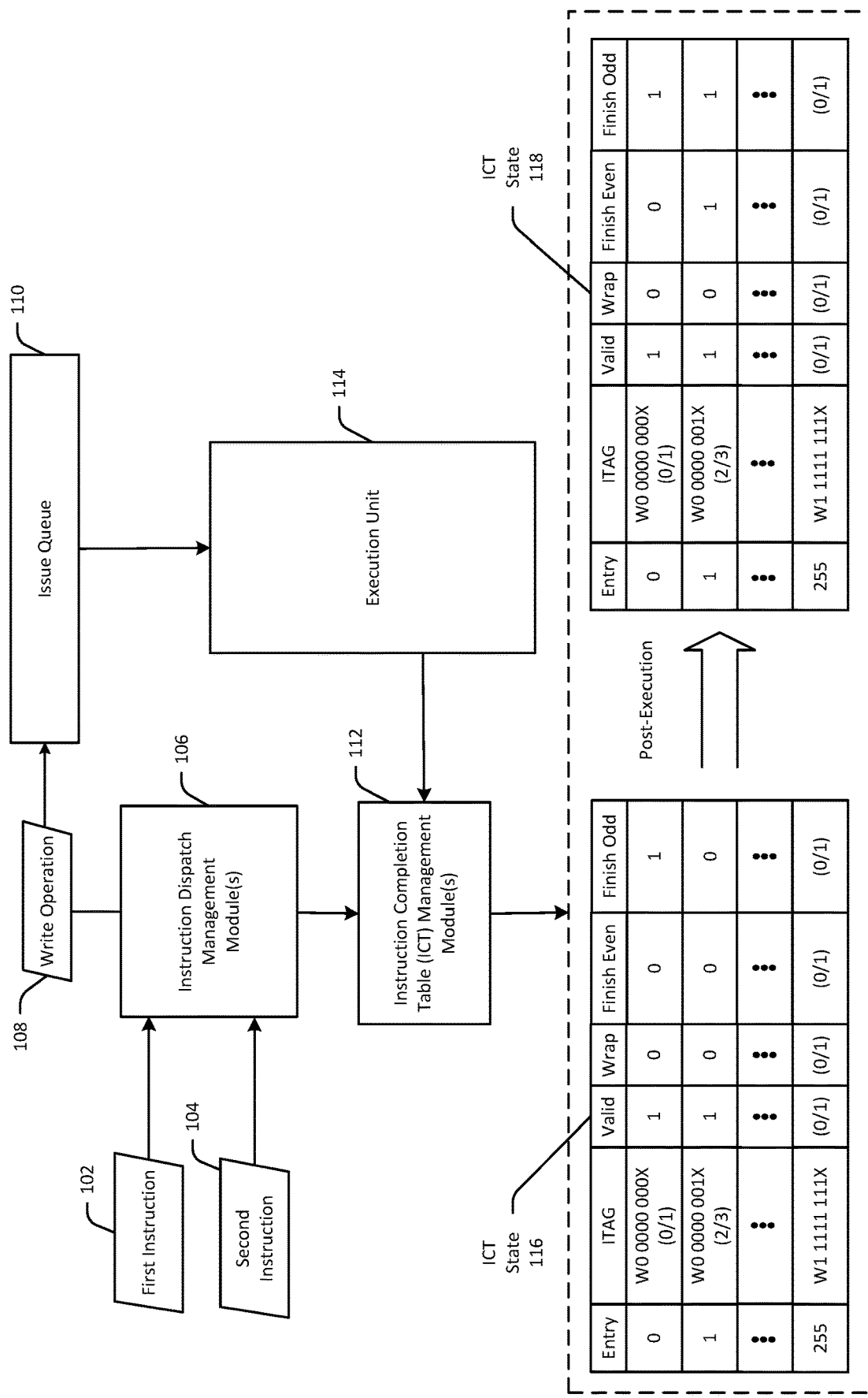
FIG. 1 is a schematic hybrid data flow/block diagram illustrating instruction execution utilizing an instruction completion table containing entries that share instruction tags in accordance with one or more example embodiments.

Example embodiments include, among other things, systems, methods, computer-readable media, techniques, and methodologies for performing instruction execution using an instruction completion table (ICT) that is configured to accommodate shared ICT entries. In accordance with example embodiments, a shared ICT entry maps to multiple instructions such as, for example, two instructions. As such, multiple instruction tags (ITAGs) can reference the same ICT entry. In this manner, an ICT in accordance with example embodiments is capable of accommodating significantly more ITAGs, and thus, significantly more corresponding instructions than a conventional ICT.

In accordance with example embodiments, a first instruction and a second instruction are grouped together into a same ICT entry at dispatch. In certain example embodiments, the first instruction and the second instruction are first determined to be eligible for entry sharing prior to being grouped together. As a non-limiting example, an instruction is eligible for sharing an ICT entry with another instruction if neither instruction is likely to take an exception during execution. In some example embodiments, two instructions grouped together in a same ICT entry may not necessarily be dispatched together.

Still referring to the example embodiments introduced above, the first instruction and the second instruction are written into an issue queue at dispatch. In addition, a shared entry in an ICT is generated for the instructions. The shared ICT entry utilizes respective ITAGs to represent the first and second instructions. In particular, an even ITAG is used to represent the first instruction (or the second instruction) and an odd ITAG is used to represent the other instruction in the grouping. More specifically, an ITAG may be 10 bits in length, for example, where the least significant bit indicates whether it is an even or an odd ITAG. The least significant bit of an ITAG is ignored when performing a lookup of the ICT to identify the shared ICT entry corresponding to the ITAG.

The shared ICT entry includes some portions that are shared between the instructions such as a valid bit that when set indicates that the instructions represented by the ICT entry are ready for execution; a wrap bit that indicates whether the ITAGs of the entry wrap around (which will be described in more detail later in this disclosure); a ready-to-complete (RTC) bit that indicates whether the ICT entry is ready to be completed; and so forth. The shared ICT entry also includes some portions that are specific to either instruction. For instance, the shared ICT entry includes a finish even bit that indicates whether the instruction corresponding to the even ITAG in the shared ICT entry has finished execution and an odd finish bit that indicates whether the instruction corresponding to the odd ITAG in the shared ICT entry has finished execution.

Still referring to the example embodiments introduced earlier, after the first and second instructions have been dispatched and a corresponding ICT shared entry has been generated that associates even and odd ITAGs with the first and second instructions, respectively, the instructions may be retrieved from the issue queue and executed by an execution unit. It should be appreciated that the instructions may not be executed in program order. For instance, the instruction associated with the odd ITAG (e.g., the second instruction) may be executed before the instruction associated with the even ITAG (e.g., the first instruction). Moreover, instructions corresponding to ICT entries subsequent to the shared ICT entry (i.e., younger ICT entries) may be executed prior to the first instruction and/or the second instruction.

After a given instruction has finished execution, the corresponding finish bit in the corresponding ICT shared entry is set to indicate this. For instance, after the first instruction executes, the even finish bit in the corresponding ICT shared entry is set to indicate that execution of the first instruction has finished. Similarly, after the second instruction executes, the odd finish bit in the corresponding ICT shared entry is set to indicate that execution of the second instruction has finished. An ICT entry is not completed until both the instruction represented by the even ITAG has finished execution and the instruction represented by the odd ITAG has finished execution. In addition, while instruction execution can occur out-of-order as noted above, ICT entries are completed in program order. Thus, still referring to the example embodiments introduced earlier, the shared ICT entry corresponding to the first and second instructions is not completed even if execution of the first and second instructions is finished until all prior/older ICT entries in the ICT have completed (i.e., all instructions dispatched prior to the first and second instructions have finished execution and have been completed).

Example embodiments also relate to various implementations for flushing instructions. In a first example flushing embodiment, only flushable instructions are permitted to be grouped together in a single ICT entry. In this example flushing embodiment, a branch instruction, for instance, would not be grouped with another instruction in a shared ICT entry. Instead, for example, a branch instruction is associated with an even ITAG of an ICT entry and a no-op instruction is associated with the odd ITAG of the same ICT entry. Because this example implementation only permits flushable instructions to be grouped together, an entire ICT entry can always be flushed. While this approach is simple to implement, a potential drawback is that instructions may not be as tightly packed in the ICT as desired.

In a second example flushing embodiment, a flushable instruction is permitted to be grouped together in a shared ICT entry with a non-flushable instruction (in contrast to the first example flushing embodiment), but an entire ICT entry is always flushed by broadcasting an even ITAG. In this example implementation, if a branch instruction is associated with an odd ITAG of a shared ICT entry and a flush is needed based on execution of the branch instruction, then the even ITAG of the next ICT entry in the ICT is broadcasted, resulting in all instructions dispatched subsequent to the branch instruction being flushed. If, however, a branch instruction is associated with an even ITAG in a shared ICT entry, then if a flush is needed, the instruction associated with the odd ITAG in that same shared ICT entry would need to be flushed without flushing the other instruction in the shared ICT entry (i.e., the branch instruction), which is not permitted in this example implementation.

Instead, in this second example flushing embodiment, a flush-to-single operation is performed. A flush-to-single operation first involves broadcasting the even ITAG associated with the branch instruction, which results in both the branch instruction and the instruction associated with the odd ITAG in the same shared ICT entry being flushed (as well as all subsequent instructions). The branch instruction is then re-dispatched at least in part by generating a new shared ICT entry that associates the branch instruction with the even ITAG of the new shared entry and associates a no-op instruction with the odd ITAG of the new shared entry. This effectively results in the branch instruction being in an ICT entry by itself. Thus, when the branch instruction is executed, if a flush is needed, an even ITAG of the next ICT entry (which corresponds to the next actual instruction following the branch instruction) is broadcasted, resulting in all instructions subsequent to the branch instruction being flushed. In both the first and second example flushing embodiments described above, flushing an ICT shared entry (i.e., flushing both the even ITAG and the odd ITAG instructions of an ICT entry) includes setting a valid bit of the ICT entry to an "invalid" state. While the second example flushing embodiment allows for greater instruction density in the ICT than the first example flushing embodiment, it does require a branch instruction to be re-executed in some scenarios (e.g., when a branch instruction is associated with an even ITAG in a shared ICT entry).

In a third example flushing embodiment, flushable instructions are permitted to be grouped with non-flushable instructions (similar to the second example flushing embodiment described above), but a flush of an instruction associated with an odd ITAG is permitted without flushing the instruction associated with the even ITAG in the same ICT entry. That is, in this third example flushing embodiment, the second half of a shared ICT entry (i.e., the instruction corresponding to the odd ITAG) can be flushed while still allowing the first half of the ICT entry (i.e., the instruction corresponding to the even ITAG) to finish and complete without re-dispatch or re-execution.

In particular, if we assume that a branch instruction is associated with an even ITAG of a particular shared ICT entry and a flush is needed after execution of the branch instruction, the odd ITAG of the particular shared ICT entry that includes the branch instruction is broadcasted, resulting in all ICT entries younger than the particular shared ICT entry being flushed. As noted earlier with respect to the first and second example flushing embodiments, flushing the younger ICT entries in this third example flushing embodiment also includes clearing the valid bits for each such ICT entry.

In contrast to other example flushing embodiments, however, the valid bit of the shared ICT entry that includes the even ITAG corresponding to the branch instruction and the odd ITAG corresponding to the instruction to be flushed is not cleared. Rather, the valid bit is maintained in the valid state because the branch instruction corresponding to the even ITAG is not to be flushed, and instead the system waits a predetermined number of execution cycles after the flush to allow the flush to be seen across the processor core. Then, an auto-finish of the odd ITAG is performed, or in other words, the odd finish bit corresponding to the odd ITAG to be flushed is automatically set to indicate that execution of the instruction has finished (even though this is not technically the case). Then, when execution of the branch instruction is finished, the entire shared ICT entry is ready to be completed because the odd ITAG instruction has been auto-finished. Then, a next instruction is re-dispatched to an even ITAG of the next ICT shared entry. While this third example flushing embodiment is a more complex implementation than the second example flushing embodiment, it continues to allow for a high density of instructions in the ICT without requiring re-dispatch and re-execution of the instruction associated with the even ITAG (e.g., the branch instruction) in the shared ICT entry that also includes the odd ITAG instruction that is to be flushed.

Various illustrative methods and corresponding data structures associated therewith will now be described. It should be noted that each operation of any of the methods 300-500 may be performed by one or more of the program modules or the like depicted in FIG. 1 or 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data. FIG. 1 is a schematic hybrid data flow/block diagram illustrating instruction execution utilizing an instruction completion table containing entries that share instruction tags in accordance with one or more example embodiments.

Figure 3:
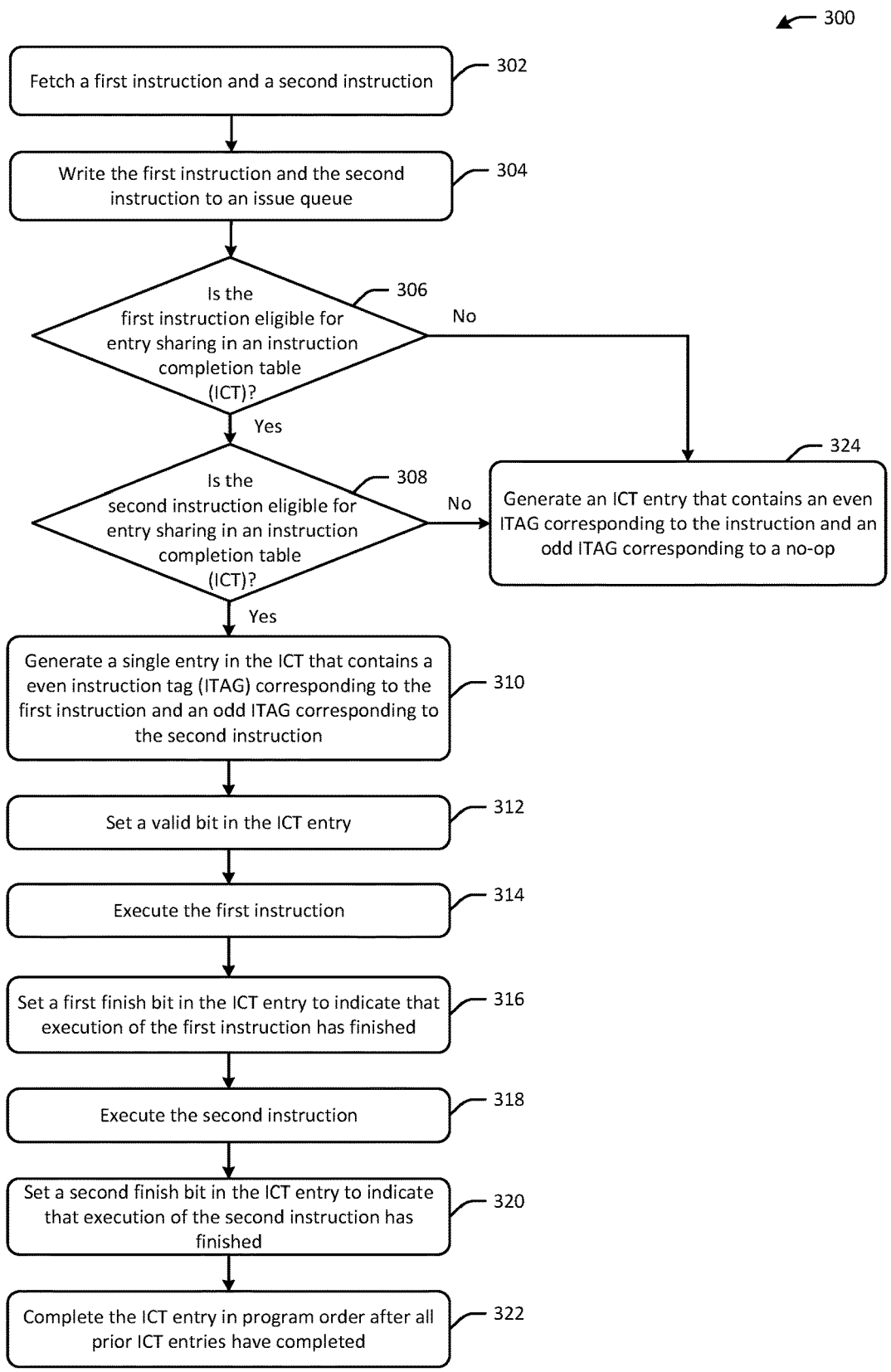
FIG. 3 is a process flow diagram of an illustrative method for performing instruction execution utilizing an instruction completion table containing entries that share instruction tags in accordance with one or more example embodiments.

FIG. 2 depicts an example implementation of an instruction completion table in accordance with one or more example embodiments. FIG. 3 is a process flow diagram of an illustrative method 300 for performing instruction execution utilizing an instruction completion table containing entries that share instruction tags in accordance with one or more example embodiments. FIGS. 1-3 will be described in conjunction with one another hereinafter.

Referring now to FIG. 3 in conjunction with FIG. 1, at block 302 of the method 300, an instruction fetch unit (IFU) (not depicted in FIG. 1) fetches a first instruction 102 and a second instruction 104. It should be appreciated that while the fetching of the first instruction 102 and the second instruction 104 is depicted as part of a same operation, the instructions may be fetched as part of separate operations. After fetching the first instruction 102 and the second instruction 104, one or more instruction dispatch management modules 106 manage the dispatching of the first instruction 102 and the second instruction 104.

In accordance with example embodiments, as part of dispatching the instructions, the instruction dispatch management modules 106 write 108 or instruct/direct another component in the instruction execution pipeline to write the first instruction 102 and the second instruction 104 to an issue queue 110 at block 304 of the method 300. Further, also as part of dispatching the instructions, the instruction dispatch management module(s) 106 determine whether the instructions are eligible for entry sharing in an ICT. In particular, at block 306 of the method 300, the instruction dispatch management module(s) 106 determine whether the first instruction is eligible for ICT entry sharing, or in other words, whether the first instruction 102 is eligible for grouping with another instruction in a single shared ICT entry. In response to a positive determination at block 306, the instruction dispatch management module(s) 106 further determine, at block 308 of the method 300, whether the second instruction 104 is eligible for ICT entry sharing.

In accordance with example embodiments, an instruction is eligible for ICT entry sharing if the instruction is not deemed likely to take an exception during execution. Further, in certain example embodiments, such as those in which the first example flushing embodiment is implemented, an instruction is also deemed not eligible for ICT entry sharing if the instruction is not a flushable instruction (e.g., a branch instruction). If either the first instruction 102 or the second instruction 104 is determined to be ineligible for ICT entry sharing (a negative determination at block 306 or a negative determination at block 308), one or more ICT management modules 112 generate an ICT entry at block 324 of the method 300. The ICT entry generated at block 324 contains an even ITAG corresponding to the instruction that was determined to be ineligible for ICT entry sharing and an odd ITAG corresponding to a no-op instruction.

FIG. 2 depicts an example implementation of an instruction completion table 200 in accordance with one or more example embodiments. The ICT 200 includes a plurality of ICT entries 202. In this example implementation, the ICT 200 includes 256 entries (0 to 255). Each of the ICT entries 202 of the example ICT 200 are capable of representing two instructions using corresponding even and odd ITAGs 204. In particular, for each shared ICT entry 202, an even ITAG is used to represent one instruction and an odd ITAG is used to represent the other instruction. For example, for shared ICT entry 0, the even ITAG is given by W0 0000 0000 and the odd ITAG is given by W0 0000 0001. The least significant bit of an ITAG 204 is ignored when using the ITAG 204 to index the ICT 200 and locate the ICT entry 202 to which the ITAG 204 maps. Thus, if the least significant bit is ignored, both the even and odd ITAGs of ICT entry 0 (W0 0000 0000 and W0 0000 0001) reduce to W 0000 0000 which maps to ICT entry 0.

A shared ICT entry 202 includes certain portions that are shared between the instructions of the ICT entry 202 such as a valid bit 206, a wrap bit 208, an RTC bit 212, and potentially additional shared content 210. Each of the valid bit 206, the wrap bit 208, and the RTC bit 212 may take on either binary value. If, for instance, the valid bit 206 of an ICT entry 202 is set to a binary 1, this indicates that both instructions of the ICT entry 202 are valid and ready for execution. Similarly, if the RTC bit 212 of an ICT entry 202 is set to a binary 1, this indicates that both instructions of the ICT entry 202 have finished execution and the ICT entry 202 is ready to be completed. However, as previously noted, the ICT entry is not completed until all older ICT entries have completed.

In accordance with example embodiments, the wrap bit 208 is the most significant bit of an ITAG 204 and indicates whether the ITAG 204 wraps around to an ICT entry that already contains an ITAG 204. For example, for the example ICT 200 that can accommodate 256 entries (0 to 255), up to 1024 ITAGs 204 can be managed in the ICT 200 by utilizing the wrap bit 208. Referring again to the example ICT entry 0, even ITAG 00 0000 0000 and even ITAG 10 0000 0000 both map to the same ICT entry 202 (entry 0), but represent ITAGs 0 and 512, respectively. Similarly, odd ITAG 00 0000 0001 and odd ITAG 10 0000 0001 both map to the same ICT entry 202 (entry 0), but represent ITAGs 1 and 513, respectively. Even ITAG 0 and odd ITAG 1 correspond to respective instructions that have been grouped together. Similarly, even ITAG 512 and odd ITAG 513 correspond to respective instructions that have been grouped together. Thus, if the respective instructions corresponding to even ITAG 0 and odd ITAG 1, for example, have finished execution and have been completed (i.e., ICT entry 0 has been completed), ICT entry 0 can be reused via setting the wrap bit 208 of ICT entry 0 to a binary 1, indicating that even ITAG 512 and odd ITAG 513 are now associated with ICT entry 0.

In accordance with example embodiments, a shared ICT entry 202 also includes certain portions that are specific to either instruction of the ICT entry 202. For instance, each shared ICT entry 202 includes a finish even bit 214 that indicates whether the instruction corresponding to the even ITAG in the shared ICT entry 202 has finished execution and an odd finish bit 216 that indicates whether the instruction corresponding to the odd ITAG in the shared ICT entry 202 has finished execution. In accordance with example embodiments, when an instruction associated with an even ITAG of a shared ICT entry 202 finishes execution, the finish even bit 214 of that ICT entry 202 may be set to a binary 1. Similarly, when an instruction associated with an odd ITAG of a shared ICT entry 202 finishes execution, the finish odd bit 216 of that ICT entry 202 may be set to a binary 1. It should be appreciated that the finish even bit 214 and the finish odd bit 216 may be set independently of one another, potentially at different times and in any order, because the corresponding instructions may be executed out-of-order. After both the finish even bit 214 and the finish odd bit 216 of a shared ICT entry 202 have been set to a binary 1 indicating that both the instruction corresponding to the even ITAG and the instruction corresponding to the odd ITAG have finished execution, the RTC bit 212 of the shared ICT entry 202 may be set to a binary 1 indicating that the entry 202 is ready to be completed. The ICT entry 202 is then completed after all older entries are completed.

While an ICT entry 202 may be described herein as containing an even ITAG and an odd ITAG, the ICT entry 202 does not store the entire even and odd ITAGs in example embodiments. Rather, in example embodiments, the even and odd ITAGs of a given ICT entry 202 may be distinguished from one another by the least significant bit of the ITAG 204, which may be ignored when utilizing an ITAG 204 to index the ICT and determine which ICT entry 202 the ITAG 204 maps to. The least significant bit of an ITAG 204 may be included to distinguish the even ITAG from the odd ITAG when, for example, broadcasting an ITAG 204 to indicate completion of execution of an instruction or to initiate an instruction flush.

Referring again to FIG. 3 in conjunction with FIG. 1, the entry generated at block 324 may be, for example, entry 0 depicted in ICT state 116 shown in FIG. 1. In example embodiments, the instruction that is determined, at block 306 or at block 308, to be ineligible for grouping with another instruction is associated with an even ITAG of ICT entry 0. As previously noted, assuming that the ICT accommodates 256 entries (0 to 255), the even ITAG may be ITAG 0 or ITAG 512 depending on whether the wrap bit is set. The instruction associated with the even ITAG in this example may be a non-flushable instruction such as a branch instruction (if the first example flushing embodiment is implemented), an instruction that is likely to take an exception during execution, or another type of instruction that is deemed ineligible for grouping. Assuming that ICT entry 0 is the entry generated at block 324, the odd ITAG of ICT entry 0 is then associated with a no-op instruction. In this manner, ICT entry 0 effectively becomes a non-shared entry. The valid bit of ICT entry 0 is set to a binary 1 to indicate that the instructions of the entry are ready for execution. Because, however, the odd ITAG of ICT entry 0 is associated with a no-op instruction, setting the valid bit of ICT entry 0 results only in execution of the instruction associated with the even ITAG. The finish odd bit may be set to a binary 1 to reflect that the no-op instruction is auto-finished. Thus, when the instruction associated with the even ITAG finishes, the even finish bit can be set and the RTC bit can be immediately set based on the finish odd bit having already been set.

On the other hand, in response to a positive determination at block 306 and a positive determination at block 308, indicating that both the first instruction 102 and the second instruction 104 are eligible for ICT entry sharing, the ICT management module(s) 112 generate, at block 310 of the method 300, a single shared ICT entry that represents the first instruction 102 using an even ITAG and that represents the second instruction 104 using an odd ITAG. As a non-limiting example, ICT entry 1 may be the single shared ICT entry generated at block 310. The first instruction 102 is associated with the even ITAG of ICT entry 1 (either ITAG 2 or ITAG 514 depending on whether the wrap bit is set) and the second instruction 104 is associated with the odd ITAG of ICT entry 1 (either ITAG 3 or ITAG 515).

In accordance with example embodiments, at block 312 of the method 300, the ICT management module(s) 112 set the valid bit of the ICT entry generated at block 310 (e.g., ICT entry 1) to a binary 1 to indicate that both instructions of ICT entry 1 (e.g., the first instruction 102 and the second instruction 104) are ready for execution, as shown in ICT state 116. Neither the finish even bit nor the finish odd bit of ICT entry 1, however, are set in ICT state 116 because neither the first instruction 102 nor the second instruction has finished execution at this stage.

Then, at block 314 of the method 300, an execution unit 114, which may include any combination of suitable hardware components (e.g., an adder, a multiplexer, etc.), retrieves the first instruction 102 from the instruction queue 110 and executes the first instruction 102. At block 316 of the method 300, after the execution unit 114 finishes execution of the first instruction 102, the ICT management module(s) 112 set the even finish bit in the ICT entry to which the first instruction 102 corresponds (e.g., ICT entry 1) to a binary 1 to indicate that execution of the instruction corresponding to the even ITAG of the ICT entry (e.g., the first instruction 102) has finished. In a similar fashion, at block 318 of the method 300, the execution unit 114 retrieves the second instruction 104 from the instruction queue 110 and executes the second instruction 104. At block 320 of the method 300, after the execution unit 114 finishes execution of the second instruction 104, the ICT management module(s) 112 set the odd finish bit in the ICT entry to which the second instruction 104 corresponds (e.g., ICT entry 1) to a binary 1 to indicate that execution of the instruction corresponding to the odd ITAG of the ICT entry (e.g., the second instruction 104) has finished. This is shown illustratively in an ICT state 118 in which the finish even bit and the finish odd bit of ICT entry 1 have both been set to a binary 1.

It should be appreciated that instructions may not be executed in program order. For instance, the instruction associated with the odd ITAG (e.g., the second instruction 104) may be executed before the instruction associated with the even ITAG (e.g., the first instruction 102). Moreover, instructions corresponding to ICT entries subsequent to (i.e., younger than) the shared ICT entry representing the first instruction 102 and the second instruction 104 may be executed prior to the first instruction 102 and/or the second instruction 104.

At block 322 of the method 300, the shared ICT entry representing the first instruction 102 and the second instruction 104 (e.g., ICT entry 1) is completed in program order after all prior ICT entries have been completed. In particular, at block 322, the ICT management module(s) 112 set the RTC bit of ICT entry 1 to a binary 1 after both the finish even bit and the finish odd bit have been set based on execution of the first instruction 102 and the second instruction 104 having finished, respectively. Setting the RTC bit indicates that the ICT entry is ready to be completed. The ICT entry, however, is not completed—despite the RTC bit being set—until all prior/older ICT entries in the ICT have completed (i.e., all instructions dispatched prior to the first and second instructions have finished execution and have been completed).

As previously noted, example embodiments also relate to various implementations for flushing instructions represented in an ICT that accommodates shared entries. In a first example flushing embodiment, only flushable instructions are permitted to be grouped together in a single ICT entry. In this example embodiment, a branch instruction, for instance, would not be grouped with another instruction in a shared ITC entry. Instead, for example, a branch instruction is associated with an even ITAG of an ICT entry and a no-op instruction is associated with the odd ITAG. Thus, in this approach, a branch instruction is deemed ineligible for entry sharing in the ICT. Because this example implementation only permits flushable instructions to be grouped together, an entire ICT entry can always be flushed.

Figure 4:
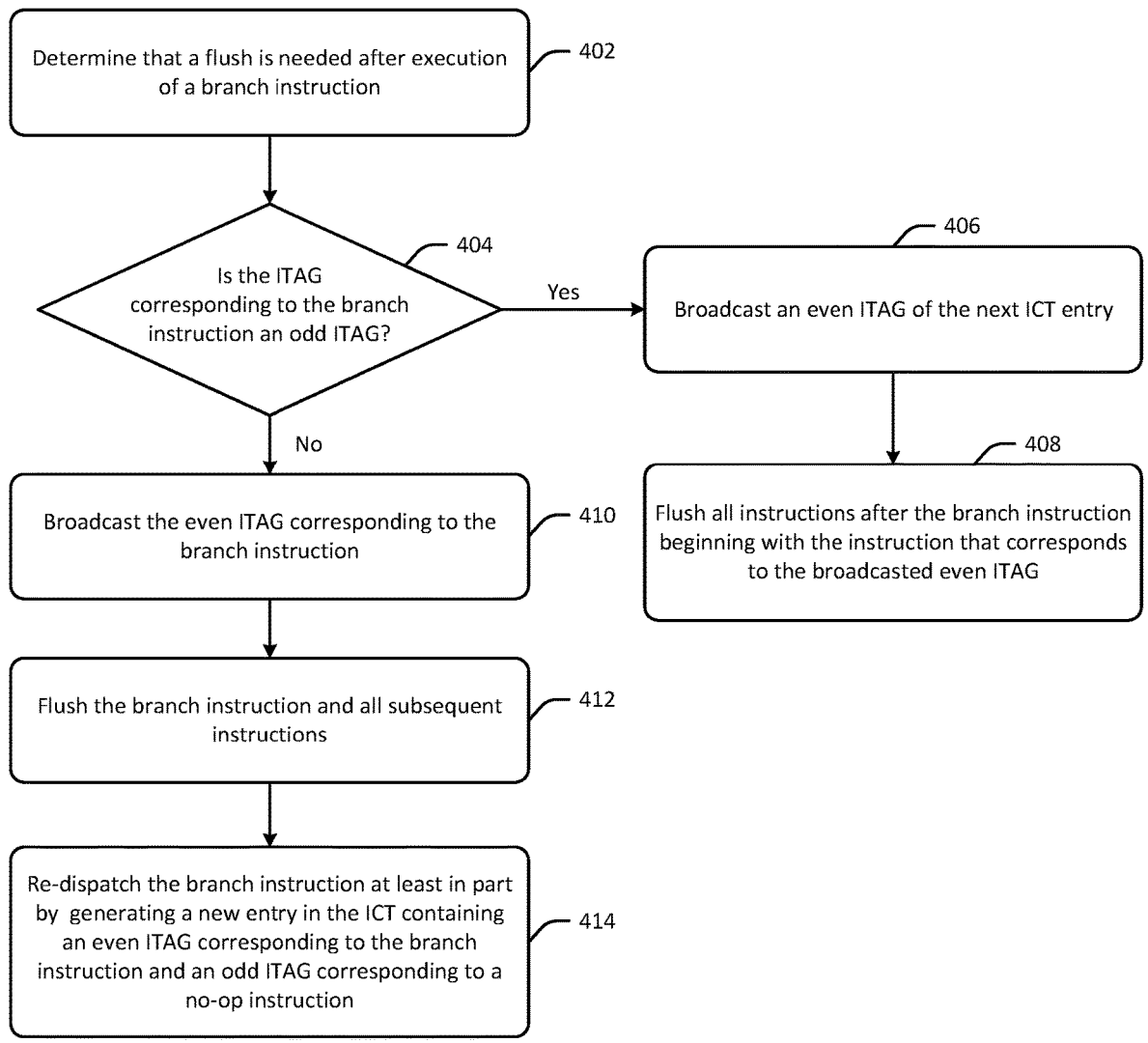
FIG. 4 is a process flow diagram of an illustrative method for performing an instruction flush in accordance with one or more example embodiments.

FIG. 4 is a process flow diagram of an illustrative method 400 for performing an instruction flush in accordance with a second example flushing embodiment. In this second example flushing embodiment, a flushable instruction is permitted to be grouped together in a shared ICT entry with a non-flushable instruction in contrast to the first example flushing embodiment, but an entire ICT entry is always flushed by broadcasting an even ITAG.

In accordance with the second example flushing embodiment, at block 402 of the method 400, one or more flushing modules determine that a flush must be performed. The flush may be needed after execution of a branch instruction has finished. For instance, a branch prediction may have been made, and as a result, a sequence of instructions may have been executed based on the branch prediction. If it turns out that the branch was incorrectly predicted based on execution of the branch instruction, then the sequence of instructions executed based on the branch prediction would need to be flushed.

At block 404 of the method 400, the flushing module(s) determine whether the ITAG corresponding to the branch instruction is an odd ITAG. In response to a positive determination at block 404, then the even ITAG of the next ICT entry in the ICT is broadcasted at block 406 of the method 400. Then, at block 408 of the method 400, all instructions dispatched subsequent to the branch instruction are flushed. In particular, all instructions represented by shared ICT entries younger than the shared ICT entry to which the branch instruction corresponds are flushed, beginning with the instruction that corresponds to the broadcasted even ITAG.

On the other hand, in response to a negative determination at block 404 indicating that the branch instruction is associated with an even ITAG in a shared ICT entry, the flushing module(s) perform a flush-to-single operation that first includes broadcasting the even ITAG corresponding to the branch instruction at block 410 of the method 400. Based on the broadcasted even ITAG corresponding to the branch instruction, both the branch instruction and the instruction associated with the odd ITAG in the same shared ICT entry are flushed at block 412 of the method 400. In addition, all subsequent instructions represented by younger ICT entries are also flushed at block 412. The branch instruction is then re-dispatched at block 414 of the method 400 at least in part by generating a new shared ICT entry that associates the branch instruction with the even ITAG of the shared entry and associates a no-op instruction with the odd ITAG of the shared entry. This effectively results in the branch instruction being in an ICT entry by itself. Thus, when the branch instruction is executed, if a flush is needed, an even ITAG of the next ICT entry (which corresponds to the next instruction following the branch instruction) is broadcast, resulting in all instructions subsequent to the branch instruction being flushed. In both the first example flushing embodiment described above and the second example flushing embodiment depicted in FIG. 4, flushing an ICT shared entry (i.e., flushing both the even ITAG and the odd ITAG instructions of an ICT entry) includes setting a valid bit of the ICT entry to an "invalid" state such as a binary 0. While the second example flushing embodiment allows for greater instruction density in the ICT than the first example flushing embodiment, it does require a branch instruction to be re-executed in some scenarios (e.g., when a positive determination is made at block 404).

Figure 5:
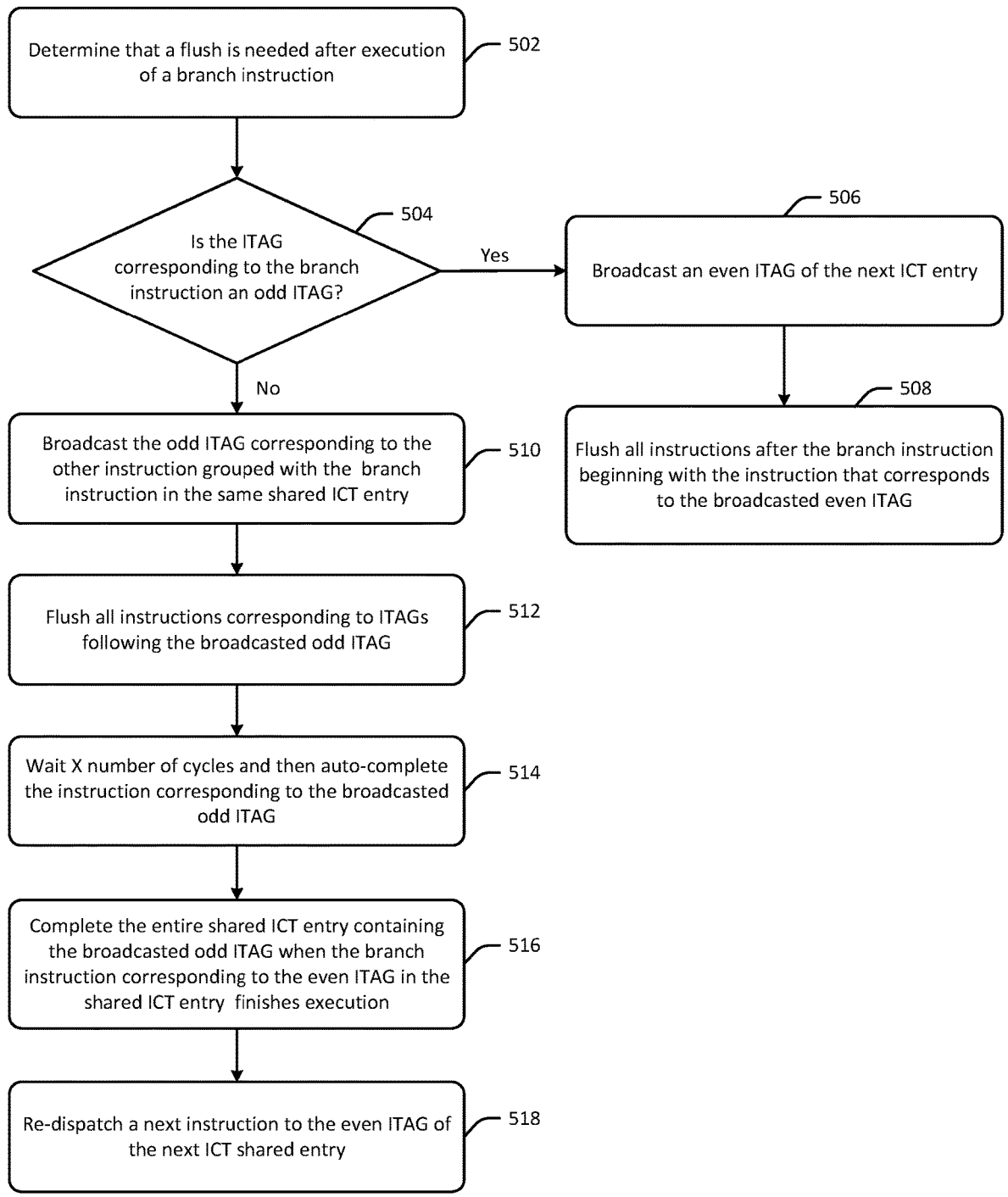
FIG. 5 is a process flow diagram of an illustrative method for performing an instruction flush in accordance with one or more alternative example embodiments.

FIG. 5 is a process flow diagram of an illustrative method 500 for performing an instruction flush in accordance with a third example flushing embodiment, according to which, flushable instructions are permitted to be grouped with non-flushable instructions (similar to the second example flushing embodiment described above), but in which a flush of an instruction associated with an odd ITAG is permitted without flushing the instruction associated with the even ITAG in the same ICT entry. That is, in this third example flushing embodiment, the second half of a shared ICT entry (i.e., the instruction corresponding to the odd ITAG) can be flushed while still allowing the first half of the ICT entry (i.e., the instruction corresponding to the even ITAG) to finish and complete without re-dispatch or re-execution.

In accordance with the third example flushing embodiment, at block 502 of the method 500, the flushing module(s) determine that a flush must be performed. The flush may be needed after execution of a branch instruction has finished. At block 504 of the method 500, the flushing module(s) determine whether the ITAG corresponding to the branch instruction is an odd ITAG. In response to a positive determination at block 504, the even ITAG of the next ICT entry in the ICT is broadcasted at block 506 of the method 500. Then, at block 508 of the method 500, all instructions dispatched subsequent to the branch instruction are flushed. In particular, all instructions represented by shared ICT entries younger than the shared ICT entry to which the branch instruction corresponds are flushed, beginning with the instruction that corresponds to the broadcasted even ITAG.

On the other hand, in response to a negative determination at block 504 indicating that the branch instruction is associated with an even ITAG in a shared ICT entry, the odd ITAG of that same shared ICT entry is broadcasted at block 510 of the method 500. The odd ITAG broadcasted at block 510 is the ITAG corresponding to the other instruction that is grouped with the branch instruction in the same shared ICT entry. Then, at block 512 of the method 500, all instructions corresponding to ITAGs following the broadcasted odd ITAG are flushed. In particular, all instructions represented by ICT entries younger than the shared ICT entry representing the branch instruction and the instruction with which the branch instruction is grouped are flushed. As noted earlier with respect to the first and second example flushing embodiments, flushing the younger ICT entries in this third example flushing embodiment also includes clearing the valid bits for each such ICT entry.

In contrast to other example flushing embodiments, however, the valid bit of the shared ICT entry that includes the even ITAG corresponding to the branch instruction and the odd ITAG corresponding to the instruction to be flushed is not cleared. Rather, the valid bit is kept on because the branch instruction corresponding to the even ITAG is not flushed, and instead the system waits, at block 514 of the method 500, a predetermined number of execution cycles after the flush to allow the flush to be seen across the processor core. Then, at block 514, an auto-finish of the odd ITAG is performed, or in other words, the odd finish bit corresponding to the odd ITAG to be flushed is automatically set to indicate that execution of the instruction has finished (even though this is not technically the case). Then, when execution of the branch instruction is finished, the entire shared ICT entry is completed at block 516 of the method 500 (assuming that all older ICT entries have been completed) based on the odd ITAG instruction having been auto-finished. Finally, at block 518 of the method 500, a next instruction is re-dispatched to the even ITAG associated with the next ICT shared entry in the ICT. While this third example flushing embodiment is a more complex implementation than the second example flushing embodiment, it continues to allow for a high density of instructions in the ICT without requiring re-dispatch and re-execution of the instruction associated with the even ITAG (e.g., the branch instruction) in the shared ICT entry where the odd ITAG instruction is to be flushed.

Example embodiments provide various technical features, technical effects, and/or improvements to computer technology. For example, example embodiments include the technical feature of an ICT that includes entries that are configured to map to multiple instruction tags, and as a result, represent multiple instructions. Thus, an ICT in accordance with example embodiments provides the technical effect of achieving greater instruction density in an ICT than conventional ICTs. In addition, example embodiments include various technical features for handling instruction flushes in connection with an ICT that can accommodate multiple instructions in a single ICT entry. These technical features and effects together constitute an improvement to computer technology—specifically an improvement to computer microarchitecture and instruction execution.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
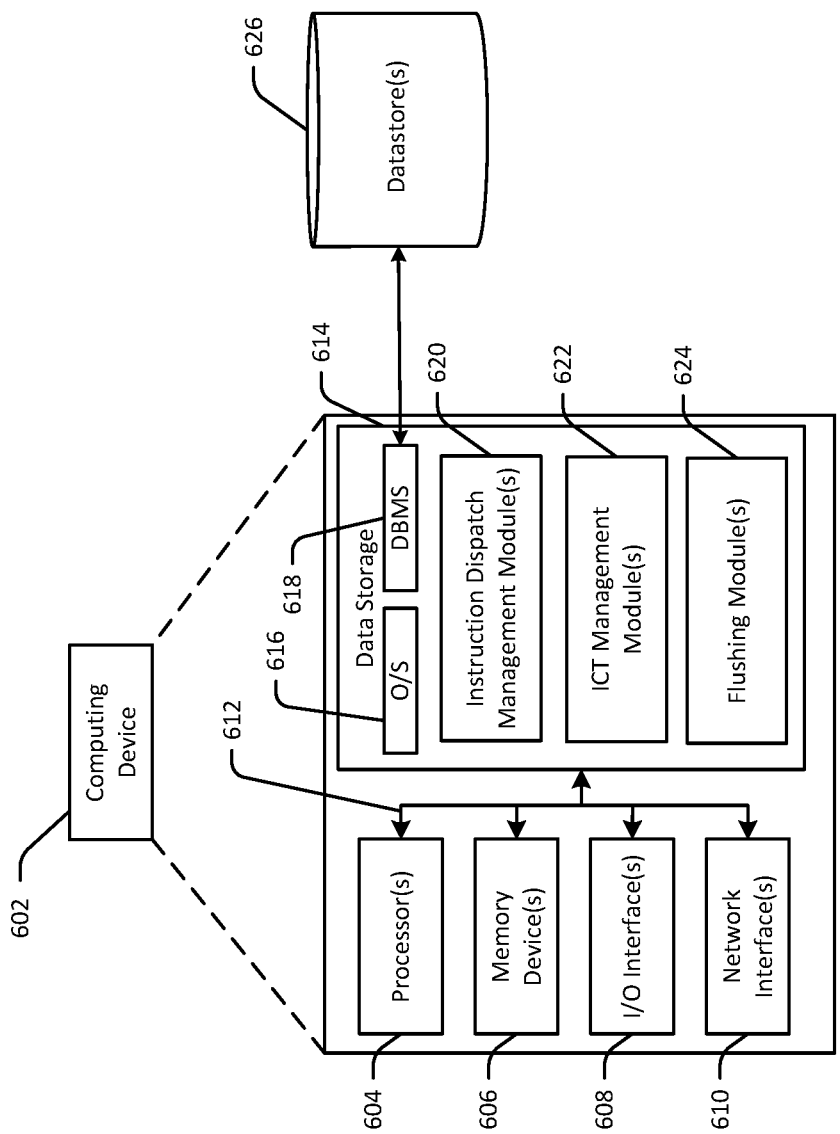
FIG. 6 is a schematic diagram of an illustrative computing device configured to implement one or more example embodiments.

FIG. 6 is a schematic diagram of an illustrative computing device 602 configured to implement one or more example embodiments of the disclosure. The computing device 602 may be any suitable device including, without limitation, a server, a personal computer (PC), a tablet, a smartphone, a wearable device, a voice-enabled device, or the like. While any particular component of the computing device 602 may be described herein in the singular, it should be appreciated that multiple instances of any such component may be provided, and functionality described in connection with a particular component may be distributed across multiple ones of such a component.

Although not depicted in FIG. 6, the computing device 602 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 may include one or more processors (processor(s)) 604, one or more memory devices 606 (generically referred to herein as memory 606), one or more input/output ("I/O") interface(s) 608, one or more network interfaces 610, and data storage 614. The computing device 602 may further include one or more buses 612 that functionally couple various components of the computing device 602.

The bus(es) 612 may include at least one of a system bus, a memory bus, an address bus, or a message bus, and may permit the exchange of information (e.g., data (including computer-executable code), signaling, etc.) between various components of the computing device 602. The bus(es) 612 may include, without limitation, a memory bus or a memory controller, a peripheral bus, an accelerated graphics port, and so forth. The bus(es) 612 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 606 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 606 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 606 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 614 may include removable storage and/or non-removable storage including, but not limited to, magnetic storage, optical disk storage, and/or tape storage. The data storage 614 may provide non-volatile storage of computer-executable instructions and other data. The memory 606 and the data storage 614, removable and/or non-removable, are examples of computer-readable storage media (CRSM) as that term is used herein.

The data storage 614 may store computer-executable code, instructions, or the like that may be loadable into the memory 606 and executable by the processor(s) 604 to cause the processor(s) 604 to perform or initiate various operations. The data storage 614 may additionally store data that may be copied to memory 606 for use by the processor(s) 604 during the execution of the computer-executable instructions. Moreover, output data generated as a result of execution of the computer-executable instructions by the processor(s) 604 may be stored initially in memory 606 and may ultimately be copied to data storage 614 for non-volatile storage.

More specifically, the data storage 614 may store one or more operating systems (O/S) 618; one or more database management systems (DBMS) 618 configured to access the memory 606 and/or one or more external datastores 626; and one or more program modules, applications, engines, managers, computer-executable code, scripts, or the like such as, for example, one or more instruction dispatch management modules 620, one or more ICT management modules 622, and one or more flushing modules 624. Any of the components depicted as being stored in data storage 614 may include any combination of software, firmware, and/or hardware. The software and/or firmware may include computer-executable instructions (e.g., computer-executable program code) that may be loaded into the memory 606 for execution by one or more of the processor(s) 604 to perform any of the operations described earlier in connection with correspondingly named modules.

Although not depicted in FIG. 6, the data storage 614 may further store various types of data utilized by components of the computing device 602 (e.g., data stored in the datastore(s) 626). Any data stored in the data storage 614 may be loaded into the memory 606 for use by the processor(s) 604 in executing computer-executable instructions. In addition, any data stored in the data storage 614 may potentially be stored in the external datastore(s) 626 and may be accessed via the DBMS 618 and loaded in the memory 606 for use by the processor(s) 604 in executing computer-executable instructions.

The processor(s) 604 may be configured to access the memory 606 and execute computer-executable instructions loaded therein. For example, the processor(s) 604 may be configured to execute computer-executable instructions of the various program modules, applications, engines, managers, or the like of the computing device 602 to cause or facilitate various operations to be performed in accordance with one or more embodiments of the disclosure. The processor(s) 604 may include any suitable processing unit capable of accepting data as input, processing the input data in accordance with stored computer-executable instructions, and generating output data. The processor(s) 604 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 604 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 604 may be capable of supporting any of a variety of instruction sets.

Referring now to other illustrative components depicted as being stored in the data storage 614, the O/S 618 may be loaded from the data storage 614 into the memory 606 and may provide an interface between other application software executing on the computing device 602 and hardware resources of the computing device 602. More specifically, the O/S 618 may include a set of computer-executable instructions for managing hardware resources of the computing device 602 and for providing common services to other application programs. In certain example embodiments, the O/S 618 may include or otherwise control the execution of one or more of the program modules, engines, managers, or the like depicted as being stored in the data storage 614. The O/S 618 may include any operating system now known or which may be developed in the future including, but not limited to, any server operating system, any mainframe operating system, or any other proprietary or non-proprietary operating system.

The DBMS 618 may be loaded into the memory 606 and may support functionality for accessing, retrieving, storing, and/or manipulating data stored in the memory 606, data stored in the data storage 614, and/or data stored in external datastore(s) 626. The DBMS 618 may use any of a variety of database models (e.g., relational model, object model, etc.) and may support any of a variety of query languages. The DBMS 618 may access data represented in one or more data schemas and stored in any suitable data repository. Data stored in the datastore(s) 626 may include, for example, ICT entry data. External datastore(s) 626 that may be accessible by the computing device 602 via the DBMS 618 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 608 may facilitate the receipt of input information by the computing device 602 from one or more I/O devices as well as the output of information from the computing device 602 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 602 or may be separate. The I/O devices may further include, for example, any number of peripheral devices such as data storage devices, printing devices, and so forth.

The I/O interface(s) 608 may also include an interface for an external peripheral device connection such as universal serial bus (USB), FireWire, Thunderbolt, Ethernet port or other connection protocol that may connect to one or more networks. The I/O interface(s) 608 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 may further include one or more network interfaces 610 via which the computing device 602 may communicate with any of a variety of other systems, platforms, networks, devices, and so forth. The network interface(s) 610 may enable communication, for example, with one or more other devices via one or more of the network(s).

It should be appreciated that the program modules/engines depicted in FIG. 6 as being stored in the data storage 614 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 602 and/or other computing devices accessible via one or more networks, may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 6 may be implemented, at least partially, in hardware and/or firmware across any number of devices.

It should further be appreciated that the computing device 602 may include alternate and/or additional hardware, software, or firmware components beyond those described or depicted without departing from the scope of the disclosure. More particularly, it should be appreciated that software, firmware, or hardware components depicted as forming part of the computing device 602 are merely illustrative and that some components may not be present or additional components may be provided in various embodiments. While various illustrative modules have been depicted and described as software modules stored in data storage 614, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 300-500 may be performed by a computing device 602 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for instruction execution utilizing an instruction completion table (ICT) containing entries that share instruction tags, the method comprising:
   fetching a first instruction;
   fetching a second instruction; and
   dispatching the first instruction and the second instruction at least in part by generating a single entry in the ICT for the first instruction and the second instruction, the ICT entry representing the first instruction using a corresponding even instruction tag (ITAG) and representing the second instruction using a corresponding odd ITAG;
   wherein the first instruction is a branch instruction, the method further comprising:
   executing the branch instruction;
   determining that a flush is needed after executing the branch instruction;
   broadcasting the odd ITAG corresponding to the second instruction;
   flushing all instructions represented by ICT entries in the ICT after the ICT entry that represents the branch instruction and the second instruction; and
   after waiting a predetermined number of execution cycles, auto-completing the second instruction corresponding to the broadcasted odd ITAG.

2. The computer-implemented method of claim 1, further comprising
   determining that each of the first instruction and the second instruction is eligible for entry sharing in the ICT.

3. The computer-implemented method of claim 1, further comprising setting a valid bit of the ICT entry at dispatch, wherein setting the valid bit indicates that the first instruction and the second instruction are valid instructions to be executed.

4. The computer-implemented method of claim 3, wherein the ICT entry comprises a finish even bit that indicates whether execution of the first instruction has completed and a finish odd bit that indicates whether execution of the second instruction has completed, the method further comprising:
   writing, at dispatch, the first instruction and the second instruction to an issue queue, wherein the first instruction is written to the issue queue prior to the second instruction in accordance with a program order;
   executing the second instruction prior to executing the first instruction;
   setting the odd finish bit to indicate that execution of the second instruction has finished;
   executing the first instruction; and
   setting the even finish bit to indicate that execution of the first instruction has finished.

5. The computer-implemented method of claim 4, further comprising:
   determining that one or more prior entries in the ICT have not been completed due to one or more corresponding instructions not having finished execution;
   waiting for completion of the one or more prior entries; and
   completing the ICT entry in the program order responsive, at least in part, to completion of the one or more prior entries.

6. The computer-implemented method of claim 1, wherein the even ITAG is a first even ITAG, and the odd ITAG is a first odd ITAG, the method further comprising:
   executing the branch instruction;
   determining that a flush is needed after executing the branch instruction;
   broadcasting the even ITAG corresponding to the branch instruction;
   flushing the branch instruction and all subsequent instructions represented in the ICT, the subsequent instructions including the second instruction; and
   re-dispatching the branch instruction at least in part by generating a new entry in the ICT, the new ICT entry representing the branch instruction using a second even ITAG and representing a no-op instruction using a second odd ITAG.

7. A system for instruction execution utilizing an instruction completion table (ICT) containing entries that share instruction tags, the system comprising:
   at least one memory storing computer-executable instructions; and
   at least one processor, wherein the at least one processor is configured to access the at least one memory and execute the computer-executable instructions to:
   fetch a first instruction;
   fetch a second instruction; and
   dispatch the first instruction and the second instruction at least in part by generating a single entry in the ICT for the first instruction and the second instruction, the ICT entry representing the first instruction using a corresponding even instruction tag (ITAG) and representing the second instruction using a corresponding odd ITAG;
   wherein the first instruction is a branch instruction and wherein the at least one processor is further configured to execute the computer-executable instructions to:
   execute the branch instruction;
   determine that a flush is needed after executing the branch instruction;
   broadcast the odd ITAG corresponding to the second instruction;
   flush all instructions represented by ICT entries in the ICT after the ICT entry that represents the branch instruction and the second instruction; and
   after waiting a predetermined number of execution cycles, auto-complete the second instruction corresponding to the broadcasted odd ITAG.

8. The system of claim 7, wherein the at least one processor is further configured to execute the computer-executable instructions to determine that each of the first instruction and the second instruction is eligible for entry sharing in the ICT.

9. The system of claim 7, wherein the at least one processor is further configured to execute the computer-executable instructions to set a valid bit of the ICT entry at dispatch, wherein setting the valid bit indicates that the first instruction and the second instruction are valid instructions to be executed.

10. The system of claim 9, wherein the ICT entry comprises a finish even bit that indicates whether execution of the first instruction has completed and a finish odd bit that indicates whether execution of the second instruction has completed, and wherein the at least one processor is further configured to execute the computer-executable instructions to:

write, at dispatch, the first instruction and the second instruction to an issue queue, wherein the first instruction is written to the issue queue prior to the second instruction in accordance with a program order;

execute the second instruction prior to executing the first instruction;

set the odd finish bit to indicate that execution of the second instruction has finished;

execute the first instruction; and set the even finish bit to indicate that execution of the first instruction has finished.

11. The system of claim 10, wherein the at least one processor is further configured to execute the computer-executable instructions to:

determine that one or more prior entries in the ICT have not been completed due to one or more corresponding instructions not having finished execution;

wait for completion of the one or more prior entries; and complete the ICT entry in the program order responsive, at least in part, to completion of the one or more prior entries.

12. The system of claim 7, wherein the even ITAG is a first even ITAG, and the odd ITAG is a first odd ITAG, and wherein the at least one processor is further configured to execute the computer-executable instructions to:

execute the branch instruction;

determine that a flush is needed after executing the branch instruction;

broadcast the even ITAG corresponding to the branch instruction;

flush the branch instruction and all subsequent instructions represented in the ICT, the subsequent instructions including the second instruction; and re-dispatch the branch instruction at least in part by generating a new entry in the ICT, the new ICT entry representing the branch instruction using a second even ITAG and representing a no-op instruction using a second odd ITAG.

13. A computer program product for instruction execution utilizing an instruction completion table (ICT) containing entries that share instruction tags, the computer program product comprising a storage medium readable by a processing circuit, the storage medium storing instructions executable by the processing circuit to cause a method to be performed, the method comprising:

fetching a first instruction;

fetching a second instruction; and dispatching the first instruction and the second instruction at least in part by generating a single entry in the ICT for the first instruction and the second instruction, the ICT entry representing the first instruction using a corresponding even instruction tag (ITAG) and representing the second instruction using a corresponding odd ITAG;

wherein the first instruction is a branch instruction, the method further comprising:

executing the branch instruction;

determining that a flush is needed after executing the branch instruction;

broadcasting the odd ITAG corresponding to the second instruction;

flushing all instructions represented by ICT entries in the ICT after the ICT entry that represents the branch instruction and the second instruction; and after waiting a predetermined number of execution cycles, auto-completing the second instruction corresponding to the broadcasted odd ITAG.

14. The computer program product of claim 13, the method further comprising setting a valid bit of the ICT entry at dispatch, wherein setting the valid bit indicates that the first instruction and the second instruction are valid instructions to be executed.

15. The computer program product of claim 14, wherein the ICT entry comprises a finish even bit that indicates whether execution of the first instruction has completed and a finish odd bit that indicates whether execution of the second instruction has completed, the method further comprising:

writing, at dispatch, the first instruction and the second instruction to an issue queue, wherein the first instruction is written to the issue queue prior to the second instruction in accordance with a program order;

executing the second instruction prior to executing the first instruction;

setting the odd finish bit to indicate that execution of the second instruction has finished;

executing the first instruction; and setting the even finish bit to indicate that execution of the first instruction has finished.

16. The computer program product of claim 15, the method further comprising:

determining that one or more prior entries in the ICT have not been completed due to one or more corresponding instructions not having finished execution;

waiting for completion of the one or more prior entries; and completing the ICT entry in the program order responsive, at least in part, to completion of the one or more prior entries.

17. The computer program product of claim 13, wherein the even ITAG is a first even ITAG, and the odd ITAG is a first odd ITAG, the method further comprising:

executing the branch instruction;

determining that a flush is needed after executing the branch instruction;

broadcasting the even ITAG corresponding to the branch instruction;

flushing the branch instruction and all subsequent instructions represented in the ICT, the subsequent instructions including the second instruction; and re-dispatching the branch instruction at least in part by generating a new entry in the ICT, the new ICT entry representing the branch instruction using a second even ITAG and representing a no-op instruction using a second odd ITAG.

* * * * *